United States Patent [19]

Sbisa

[11] Patent Number: 5,793,853
[45] Date of Patent: Aug. 11, 1998

[54] SYSTEM AND METHOD FOR RECORDING BILLING INFORMATION FOR A TELECOMMUNICATIONS SERVICE REQUEST

[75] Inventor: Daniel Charles Sbisa, Blue Springs, Mo.

[73] Assignee: Sprint Communications Co., L.P., Kansas City, Mo.

[21] Appl. No.: 493,438

[22] Filed: Jun. 22, 1995

[51] Int. Cl.$^6$ .................................................. H04M 15/00
[52] U.S. Cl. .......................... 379/120; 379/119; 379/115; 379/230
[58] Field of Search ............................. 379/91, 111, 112, 379/113, 114, 115, 116, 119, 120, 121, 133, 134, 135, 201, 207, 219, 220, 222, 223, 229, 230

[56] References Cited

U.S. PATENT DOCUMENTS

| | | | |
|---|---|---|---|
| 5,003,584 | 3/1991 | Benyacar et al. | 379/91 |
| 5,008,929 | 4/1991 | Olsen et al. | 379/115 |
| 5,103,475 | 4/1992 | Shuen | 379/115 |
| 5,511,113 | 4/1996 | Tasaki et al. | 379/114 |
| 5,517,560 | 5/1996 | Greenspan | 379/121 |

*Primary Examiner*—Curtis Kuntz
*Assistant Examiner*—Paul Loomis
*Attorney, Agent, or Firm*—Harley R. Ball; Jed W. Caven

[57] ABSTRACT

A system for recording the services provided by a telecommunications network in response to a service request generates a number of individual records corresponding to the number of network elements providing telecommunications services in response to the request. Each individual record contains information relating to the services provided by the corresponding network element. Those service requests requiring the services of two or more network elements are assigned an identifier which is stored in each corresponding record. Records having a common identifier are matched with one another and merged into a single network record corresponding to the service request. Billing statements and statistical reports may be derived from the single network record.

34 Claims, 2 Drawing Sheets

SYSTEM AND METHOD FOR RECORDING BILLING INFORMATION FOR A TELECOMMUNICATIONS SERVICE REQUEST

BACKGROUND OF THE INVENTION

This invention relates in general to recording the services provided by a telecommunications network in response to a service request and, more particularly, to a system and method for processing multiple records relating to the same service request into a single network record for each request.

Telecommunications service providers generate substantial information about the services they have provided to their customers. This information is very useful for understanding the needs of their customers and for billing purposes. For example, each time a long distance telephone call is placed, the long distance carrier typically creates a call detail record (CDR) corresponding to that call. A CDR will usually include information such as the dialed number, the date and time of the call, and the duration of the call. Many enhanced services (e.g., conferencing, call allocation and 800 services) are also available and may be identified in the CDR. These enhanced services often require the services of multiple network elements to accommodate the call processing functions associated with such a request. In fact, as many as 250 items may be stored in a single CDR corresponding to a single telephone call or other telecommunications service request.

For either an 800 call or a standard long distance call, the call is first received by a local exchange carrier (LEC) and is then forwarded to the appropriate interexchange carrier (IXC). The IXC switch that receives the call from the LEC switch is referred to as the "originating switch" in the IXC network. Based on the signaling information forwarded from the LEC, the originating switch will determine where the call should be forwarded within the IXC network. Specifically, the originating switch will select a "terminating switch" that is located near the destination of the call. The originating switch may process standard long distance telephone calls without requesting the services of other network elements. However, for 800 calls, the originating switch typically queries a remote database containing routing instructions for forwarding the call to the appropriate terminating switch. Next, the terminating switch forwards the call to the appropriate LEC switch, which then completes the connection with the called party. Presently, the originating switch creates the entire CDR for the IXC network. The CDRs created by the various IXC switches are eventually forwarded to the IXC's billing system. Detailed billing statements and/or statistical analyses of caller activity may be derived from these CDRs.

One drawback to the system described above, from an IXC's point of view, is that the software controlling each telecommunications switch, and therefore controlling each originating switch, is provided by the switch vendor. Consequently, the switch vendor controls the switch software and must revise the software whenever the IXC changes its approach to billing or otherwise modifies its system. This cumbersome arrangement between the IXC and the vendor inhibits the flexibility of the IXC in operating and updating its billing system and discourages the IXC from offering new, enhanced services.

Another disadvantage associated with having an originating switch generate the entire CDR is the volume of traffic that results each time an originating switch queries another network element. For example, an originating switch may need to request information from a remote database such as a service control point (SCP) before forwarding a call to the appropriate terminating switch. The originating switch queries the SCP using a protocol that facilitates communication between the two devices. The SCP responds to the query by sending the requested information back to the originating switch using the designated protocol (e.g., SS7, TCP/IP or ISDN). Because these types of transactions occur frequently in a typical IXC network, communications links between the switches and the other network elements often become congested with numerous queries and responses. Moreover, each link has physical limitations regarding the quantity of data it can transmit, so the traffic over the link must not exceed the capacity of the link.

The problem with congested communications links is particularly acute where the response to the originating switch includes billing information as opposed to call routing information. Operator centers, for example, provide such service functions as collect calling, conferencing, and foreign language interpretation. When the originating switch passes service control to an operator center, the operator center primarily generates billing information related to the services provided. Such billing information is generally not used by the originating switch for processing the call.

SUMMARY OF THE INVENTION

The present invention is directed to a system and method for generating a single network record for telecommunications services provided in response to a service request. The invention overcomes the problems and limitations set forth above by creating individual records associated with the services provided by each individual network element in response to a service request, then combining these individual records into a single network record corresponding to the service request. This arrangement permits the IXC to provide and control the software for creating and processing the CDRs since the IXC typically controls the communications between network elements. Thus, the IXC is no longer dependent on a vendor to implement software revisions. As a result, the IXC will have increased flexibility in billing its customers for special services. Rather than charging a flat fee for subscribing to optional services (e.g., time of day routing), the IXC is in a position to offer its customers usage-based fees derived from the individual records generated by each network element.

Further, communications traffic between the network elements is greatly reduced because the other network elements are no longer required to transmit billing information back to the originating switch. Rather, a first network element receives the service request and generates an individual record corresponding to the services it provides in response to the request. Then, the first network element sends a message to any additional network element that will provide services in response to the service request. These additional network elements will create their own individual records relating to the services provided in response to the request, but the additional network elements will not need to transmit any billing information or records back to the first network element. Therefore, substantial efficiencies are achieved in the communications protocols linking the various network elements.

Accordingly, it is an object of the present invention to provide a system and method for creating a single network record containing information relating to the services provided by a telecommunications network in response to a service request wherein the telecommunications carrier controls the communications software.

It is a further object of the present invention to provide a system and method for generating a single network record containing information relating to the services provided by a telecommunications network in response to a service request so that congestion is substantially reduced in the communications links connecting the various network elements.

It is yet a further object of the present invention to provide a system and method for generating a single network record containing information relating to the services provided by a telecommunications network in response to a service request wherein each network element providing services creates an individual record relating to the services provided by that network element in response to the request.

These and other related objects of the present invention will become readily apparent upon further review of the specification and drawings. To accomplish the objects of the present invention, a system for recording the services provided by a telecommunications network in a single network record is provided which has a first network element for generating individual records containing information related to the services provided by the first network element in response to a service request, at least one additional network element for generating individual records containing information relating to the services provided by the additional network elements in response to the service request, means for assigning a key identifier to the individual records corresponding to those service requests requiring services from more than one network element, and a record processor which receives the individual records, compares the key identifiers, and merges the individual records having the same key identifier into a single network record.

In another aspect, a method for recording the services provided by a telecommunications network in a single record is provided which includes receiving service requests requiring the services of at least one network element, generating a first record for each service request containing information relating to the services provided by a first network element in response to the request, generating a number of additional records each relating to the services provided by an additional element in response to the service request, matching each first record with any additional records corresponding to the same service request, and processing all of the records so that the information relating to the services provided by the telecommunications network in response to each service request is contained in a single network record corresponding to that service request.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENT

Figure 1:
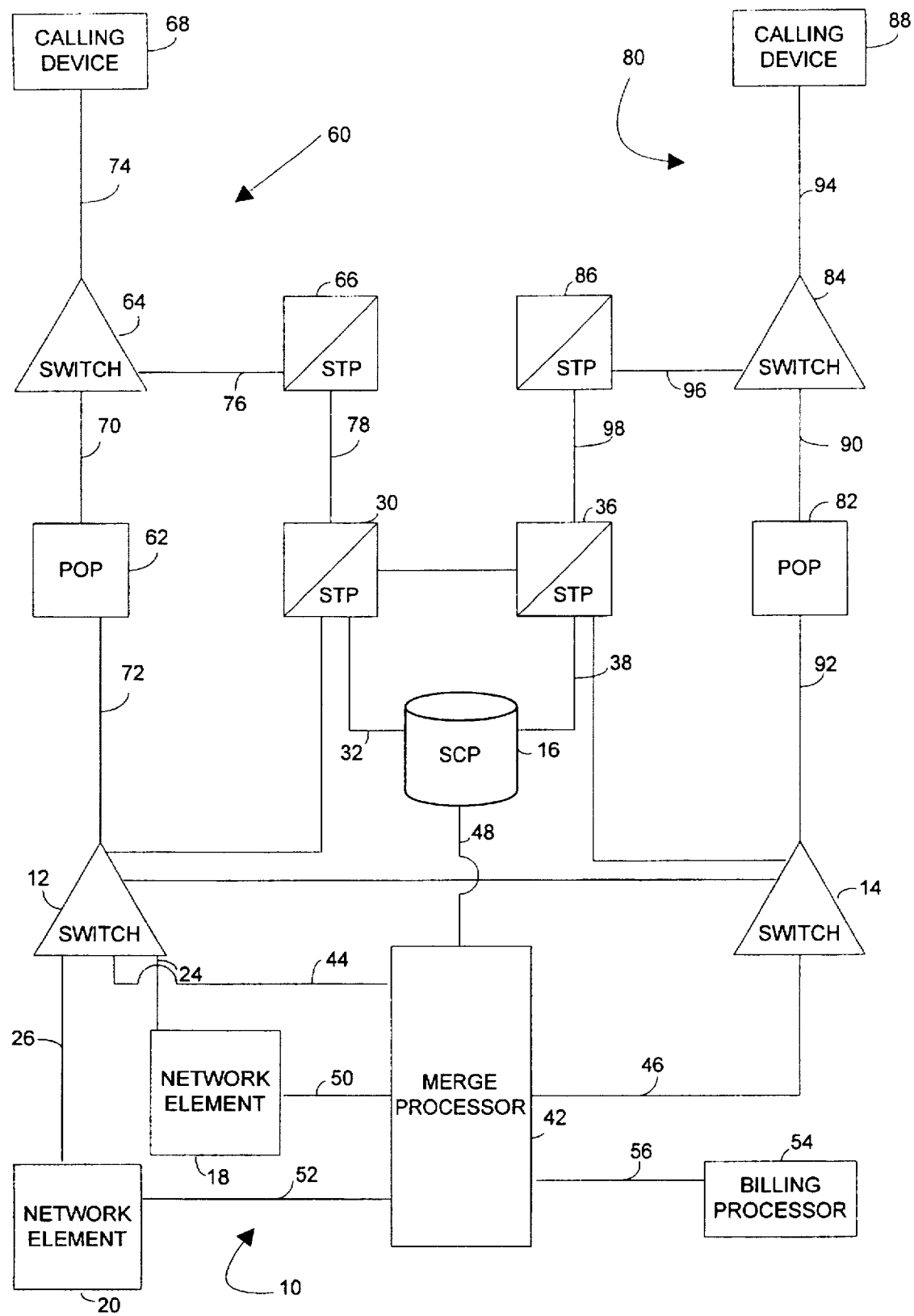
FIG. 1 is a block diagram showing an interexchange carrier network coupled with first and second local exchange carrier networks in accordance with the preferred embodiment of the present invention.

Referring to the drawings in greater detail, and initially to FIG. 1, the telecommunications network of the present invention is designated generally by reference numeral 10. Network 10 comprises a plurality of network elements such as telecommunications switches 12 and 14, a service control point (SCP) 16, and additional network elements 18 and 20. Switch 12 is connected to switch 14 via a communications link 22, and switch 12 is connected to additional elements 18 and 20 by links 24 and 26, respectively. Switch 12 is connected to SCP 16 through a link 28, a signal transfer point (STP) 30 and a link 32. Likewise, switch 14 is coupled with SCP 16 via a link 34, a STP 36, and a link 38. A link 40 couples STP 30 and STP 36.

Network 10 also includes a merge processor 42 coupled to switch 12 via a link 44 and to switch 14 via a link 46. Further, processor 42 is coupled to network elements 16, 18 and 20 via links 48, 50 and 52, respectively. Finally, network 10 includes a billing processor 54 connected to merge processor 42 by a link 56.

Although network 10 is an IXC network in the disclosed embodiment, in another embodiment network 10 could be a LEC network or any other network providing telecommunications services. In the preferred embodiment, IXC network 10 is coupled to a first LEC network 60 at an IXC point of presence (POP) 62. LEC network 60 includes a switch 64, a STP 66 and a plurality of individual calling terminals such as terminal 68. LEC switch 64 is connected to IXC switch 12 via a link 70, a POP 62 and a link 72. A link 74 represents the connection between LEC switch 64 and terminal 68. STP 66 is connected to switch 64 by a link 76 and to STP 30 via a link 78.

IXC network 10 is also coupled with a second LEC network 80 via a POP 82. Network 80 includes a switch 84, a STP 86 and a plurality of individual terminals such as terminal 88. Switch 84 is coupled to IXC switch 14 via a link 90, a POP 82 and a link 92. A link 94 represents the connection between LEC switch 84 and the terminal 88. STP 86 is coupled with switch 84 via a link 96 and with IXC STP 36 via a link 98.

Those skilled in the art will readily appreciate that the specific components of network 10, network 60 and network 80 may vary somewhat from the disclosed embodiment without significantly deviating therefrom. Moreover, many of the identified components may exist in a variety of forms in a given telecommunications network. For example, terminals 68 and 88 may be voice terminals (e.g., a telephone) and/or data terminals (e.g., a computer). Likewise, those skilled in the art will recognize that additional network elements 18 and 20 may be any network element adapted to provide telecommunications services in response to a service request. For example, element 18 could be a generic service platform (e.g., an intelligent peripheral) or an enhanced services platform. Likewise, element 20 could be a telecommunications switch, a SCP, a STP, a POP, or an operator center. The specific embodiment of elements 18 and 20 may affect the selection of a protocol for communicating with the other network elements but will not significantly depart from the preferred embodiment described herein.

Figure 2:
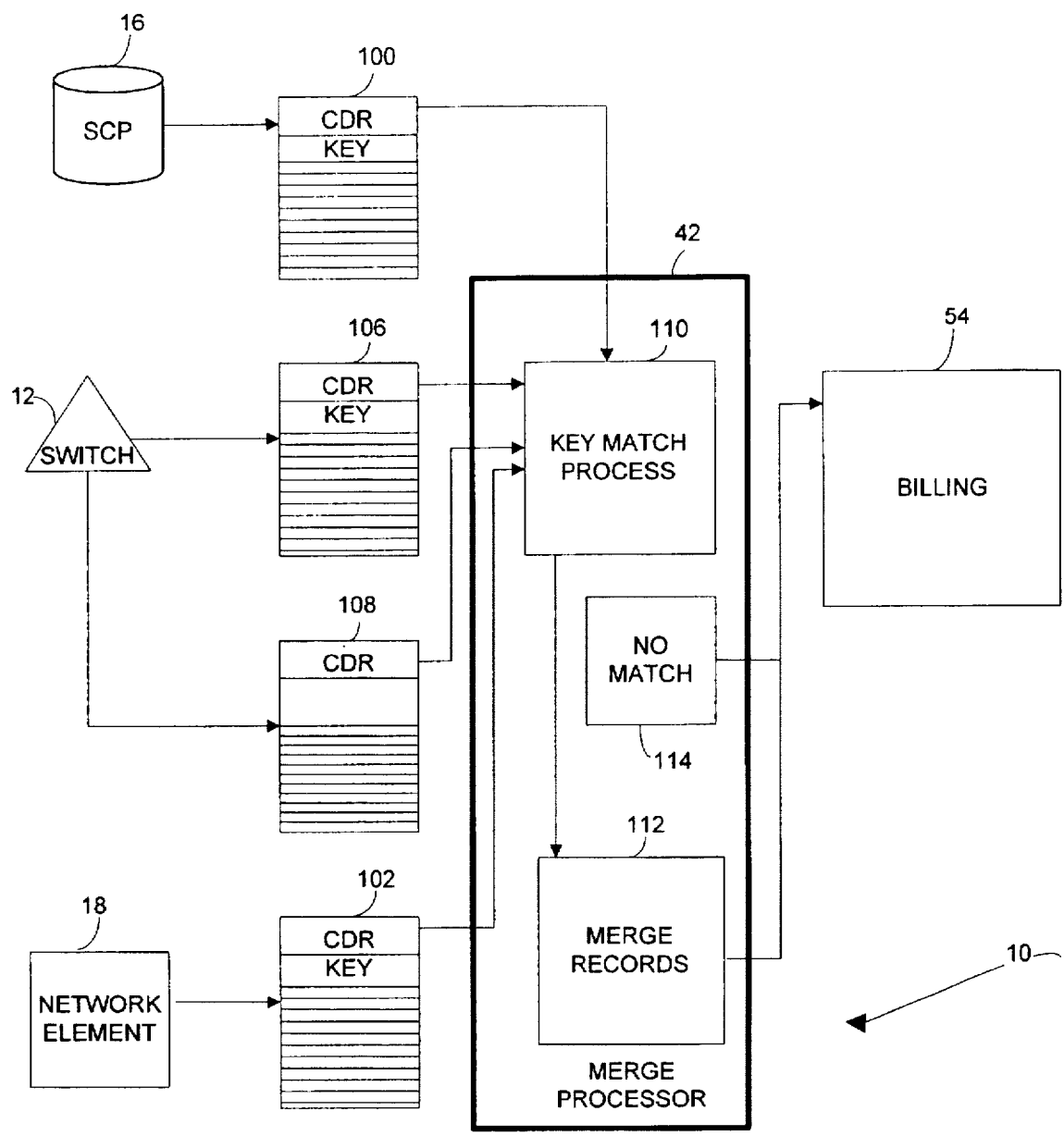
FIG. 2 is a flow diagram illustrating the method of generating and processing call detail records in accordance with the preferred embodiment of the present invention.

With reference to FIG. 2, network 10 is depicted in a flow diagram. As network element 16 provides telecommunications services in response to a service request, a CDR 100 is developed containing information relating to the specific services provided by element 16. Similarly, element 18 generates a CDR 102 containing information relating to the specific services provided by element 18 in response to a service request. However, element 12 may generate either a CDR 106 containing information relating a portion of the services provided by the network (e.g., relating to only those services provided by element 12) in response to a service request, or element 12 may produce a CDR 108 containing information relating to all of the services provided by any network element in response to a service request.

In operation, network 10 may receive a plurality of service requests including some service requests which require the services of more than one network element. Each service request received by network 10 is initially forwarded to a first network element. Although the first network element might not be the same network element for every service request, element 12 is treated as the first network element in the disclosed embodiment. As each service request is processed, switch 12 generates a corresponding CDR similar to CDR 108. If the service request does not require the services of any other network element, then switch 12 will have generated the entire CDR for that request and will forward the CDR (CDR 108) to merge processor 42 via link 44.

On the other hand, if switch 12 determines that the service request requires the services of another network element, switch 12 sends an appropriate message to the other network element. If the service request requires the services of both switch 12 and SCP 16, for example, switch 12 sends a message to SCP 16 identifying the requested services. SCP 16 then creates a CDR similar to CDR 100 and assigns an identification key to be stored in that CDR. As described more fully below, the identification key includes both a network element code and a key identifier corresponding to the service request. SCP 16 may acknowledge receipt of the message from switch 12 by transmitting the key identifier and any necessary routing information back to switch 12.

The carrier-controlled communications software is designed so that the key identifier can be forwarded to any network element independent of the particular protocol established between any two network elements. After the key identifier is forwarded to switch 12, the switch stores the identifier in the switch CDR corresponding to the service request as shown in FIG. 2 (CDR 106). After the service request has been processed, the CDR created by SCP 16 (CDR 100) and the CDR created by switch 12 (CDR 106) are forwarded to merge processor 42. Likewise, the service request may also require the services of additional element 18, which will therefore generate its own CDR containing the appropriate key identifier as shown in FIG. 2 (CDR 102). Then, CDR 102 is forwarded to merge processor 42 via link 50.

The means for assigning an identification key to the individual records corresponding to a service request requiring services from a plurality of network elements could be located anywhere in network 10. In the disclosed embodiment, switch 12 is the first network element to receive a service request. Thus, switch 12 is the "primary network element" for a service request from terminal 68 requiring the services of multiple network elements. As such, switch 12 could assign an identification key to every service request and forward the key identifier to the additional network elements as needed, or switch 12 could assign an identification key only for those service requests invoking the services of two or more network elements.

In the preferred embodiment, however, an additional network element actually assigns the identification key in response to a message from switch 12 and then forwards the key identifier to switch 12 as an acknowledgment that the message has been received. Further, it is presently preferred to use a nine-digit identification key wherein the first three digits identify a specific network element and the last six digits are a key identifier generated by a counter device which is incremented for each service request requiring services from a plurality of network elements. For example, a single service request requiring the services of switch 12, SCP 16 and element 18 may be assigned the following identification keys: 012000001, 016000001, and 018000001. Similar methods and devices for assigning an identification key to the CDRs will be readily apparent to those skilled in the art.

The present invention provides several advantages over the prior art. First, the IXC controls the software for communications between network elements and therefore controls the billing software. Consequently, the IXC is not dependent on the switch vendor for making software revisions. Second, the IXC may present its customers with more flexible billing options. Instead of a flat subscription fee, IXC customers may prefer usage-based fees such as a variable rate based on the level of usage or a predetermined fee for each individual call that requires the special service. Additionally, the individual records generated by the additional network elements enable the IXC to provide its customers with a detailed statistical analysis of the customers' call history. Finally, communications traffic between the network elements is significantly reduced. Rather than transmitting billing information from each secondary network element to the primary network element before it is forwarded to the merge processor, the billing information may be sent directly to the merge processor from the secondary network elements. Advantageously, this arrangement should result in increased traffic handling capacity for the IXC network.

As shown in FIG. 2, merge processor 42 includes a key match process 110 wherein CDRs having the same key identifier (i.e., same last six digits of identification key) are matched with one another. The matched records are forwarded from process 110 to a merge records area 112. It is presently preferred to append any records created by a secondary or additional network element to the record created by the first or primary network element at block 112. The merge process may exclude or delete certain information from the appended records if the information is redundant or no longer relevant. For example, if CDR 100 includes an initial list of several alternative network routes, those routes that were not actually used may be deleted during the merge process so that the length of the merged record is reduced.

Those records that are not matched with any other records during the key match process (e.g., CDR 108) are forwarded to no match buffer 114. Finally, all of the records in buffer 114 and all of the merged records at block 112 are forwarded to the billing processor 54 via link 56.

Although switch 12 is referred to above as the "primary network element," it will be appreciated that switch 14 would be the primary network element, in accordance with the preferred embodiment of the invention, for calls originating from terminal 88. Switches 12 and 14 are preferably DMS-250 telecommunications switches manufactured by Northern Telecom. Those skilled in the art will appreciate that network elements 16, 18 or 20 could also act as the primary network element for certain service requests.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. In a telecommunications network including a plurality of network elements, a method for recording information relating to the services provided by the telecommunications network in response to a telecommunications service request requiring the services of a primary network element and at least one secondary network element, said method comprising:

generating a primary record containing information relating to the services provided by a primary network element in response to the request and an identification key;

transmitting the primary record from the primary network element to a separate network element including a merge processor;

generating at least one secondary record, wherein each secondary record contains information relating to the services provided by a secondary network element in response to the service request and an identification key containing information associating the secondary record with the primary record;

transmitting the at least one secondary record from the secondary network element to the merge processor;

comparing the identification keys of records received at the merge processor; and merging associated primary and secondary records to form a single network record containing information relating to the services provided by the primary and secondary network elements in response to the request.

2. The method of claim 1, wherein a plurality of secondary records are generated by a plurality of secondary network elements.

3. The method of claim 1, wherein the primary record is generated by the primary network element.

4. The method of claim 3, wherein the primary network element includes a telecommunications switch.

5. The method of claim 1, wherein each secondary record is generated by a secondary network element.

6. The method of claim 5, wherein at least one secondary network element includes a generic service platform.

7. The method of claim 5, wherein at least one secondary network element includes a service control point.

8. The method of claim 5, wherein at least one secondary network element includes an enhanced services platform.

9. The method of claim 5, wherein at least one secondary network element includes an operator center.

10. A method for recording in a single network record the services provided by a telecommunications network responsive to a service request, wherein the telecommunications network includes a plurality of network elements, said method comprising:

generating a primary record for each service request, each primary record containing information relating to the services provided by a primary network element in response to the corresponding service request;

transmitting the primary record from the primary network element to a separate network element including a merge processor;

generating at least one secondary record for each service request, each secondary record containing information relating to the services provided by a secondary network element in response to the corresponding service request and an identification key;

transmitting the at least one secondary record from the secondary network element to the merge processor;

matching each primary record with any secondary records generated in response to the same service request; and processing the primary and secondary records so that the information relating to the services provided by each of the network elements in response to a service request is contained in a single network record corresponding to that service request.

11. The method of claim 10, wherein the number of secondary records generated for at least one service request is greater than or equal to one.

12. The method of claim 10, wherein the secondary records corresponding to the same service request are assigned the same identification key.

13. The method of claim 12, wherein the matching step further comprises matching primary and secondary records containing the same identification key.

14. The method of claim 13, wherein identification keys are assigned by a counter.

15. The method of claim 10, wherein the primary network element includes a telecommunications switch.

16. The method of claim 10, wherein each secondary record is generated at a secondary network element.

17. The method of claim 10, wherein the secondary network element comprises a generic service platform.

18. The method of claim 10, wherein the secondary network element comprises a service control point.

19. The method of claim 10, wherein the secondary network element comprises an enhanced services platform.

20. The method of claim 11, wherein the secondary network element comprises an operator center.

21. The method of claim 10, wherein the processing step further includes merging the primary and secondary records corresponding to the same service request into a single network record by appending each additional record to the corresponding first record.

22. The method of claim 10, wherein the processing step further includes deleting a portion of the information contained in the primary record.

23. The method of claim 10, wherein the processing step further includes deleting a portion of the information contained in a secondary record.

24. A system for generating one or more records for recording information relating to the services provided by a telecommunications network in response to a service request, wherein the telecommunications network includes a plurality of network elements, said system comprising:

a primary network element adapted to generate a primary record in response to a service request, the primary record containing information relating to the services provided by the primary network element in response to the corresponding service request;

at least one secondary network element adapted to generate a secondary record, in response to a service request, the secondary record containing information relating to the services provided by the secondary network element in response to the corresponding service request;

means for assigning an identification key to the primary and secondary records, the identification key including information for associating the primary and secondary records; and a third network element separate from the primary network element and the secondary network element adapted to receive records from the primary network element and the secondary network element and comprising means for comparing the identification keys assigned to the records and means for merging associated records.

25. The system of claim 24, wherein the primary network element comprises a telecommunications switch.

26. The system of claim 24, wherein a secondary network element comprises a generic service platform.

27. The system of claim 24, wherein a secondary network element comprises a service control point.

28. The system of claim 24, wherein a secondary network element comprises an enhanced services platform.

29. The method of claim 24, wherein a secondary network element comprises an operator center.

30. The system of claim 24, wherein each assigned identification key is stored in the corresponding records.

31. The system of claim 24, wherein said assigning means includes a counter.

32. The system of claim 24, wherein the third network element comprises a merge processor which receives the records, compares the identification key assigned to the records, and merges the records assigned the same identification key into a single network record.

33. The system of claim 24, wherein only those individual records containing an assigned identification key are merged with any other records.

34. The system of claim 32, wherein the merge processor deletes a portion of the information contained in the individual records.

* * * * *